July 9, 1957 A. J. MONCRIEFF-YEATES 2,798,959
PHOTOCONDUCTIVE THERMOGRAPHY
Filed Oct. 1, 1953 3 Sheets-Sheet 3
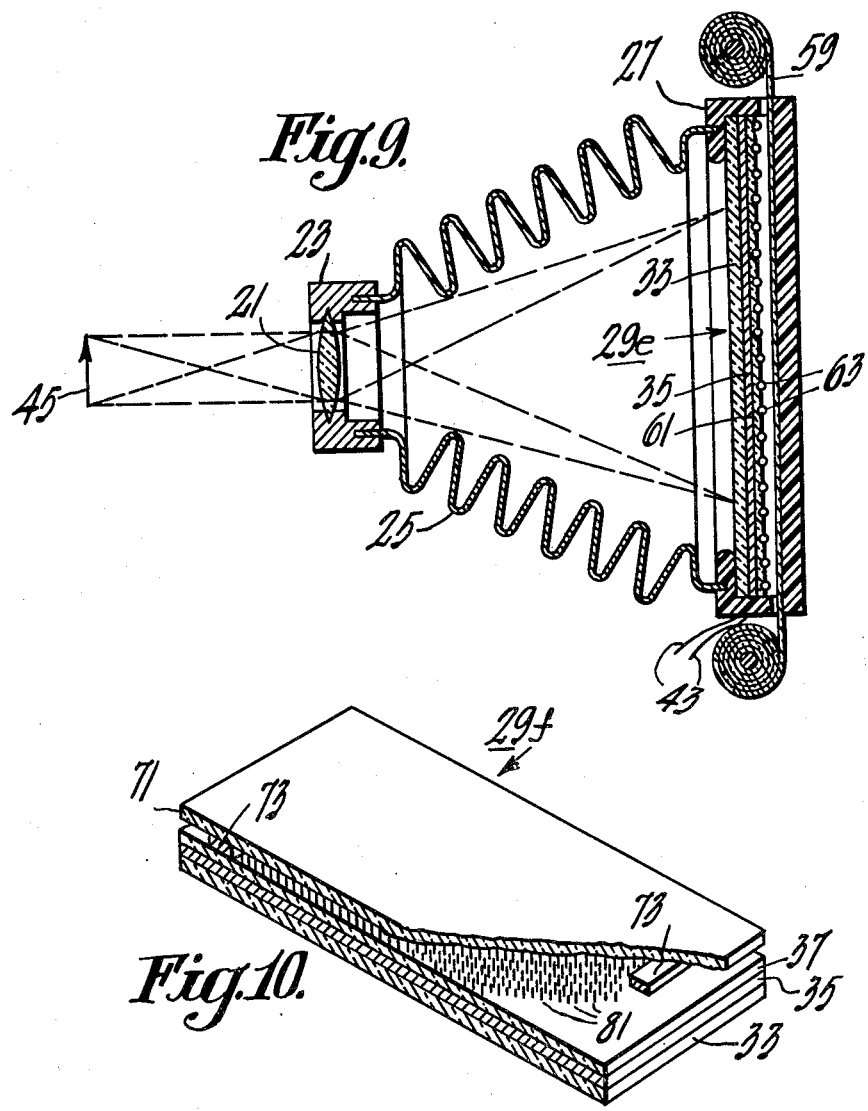
INVENTOR.
ALEXANDER J. MONCRIEFF-YEATES
BY
ATTORNEY United States Patent Office 2,798,959
Patented July 9, 1957

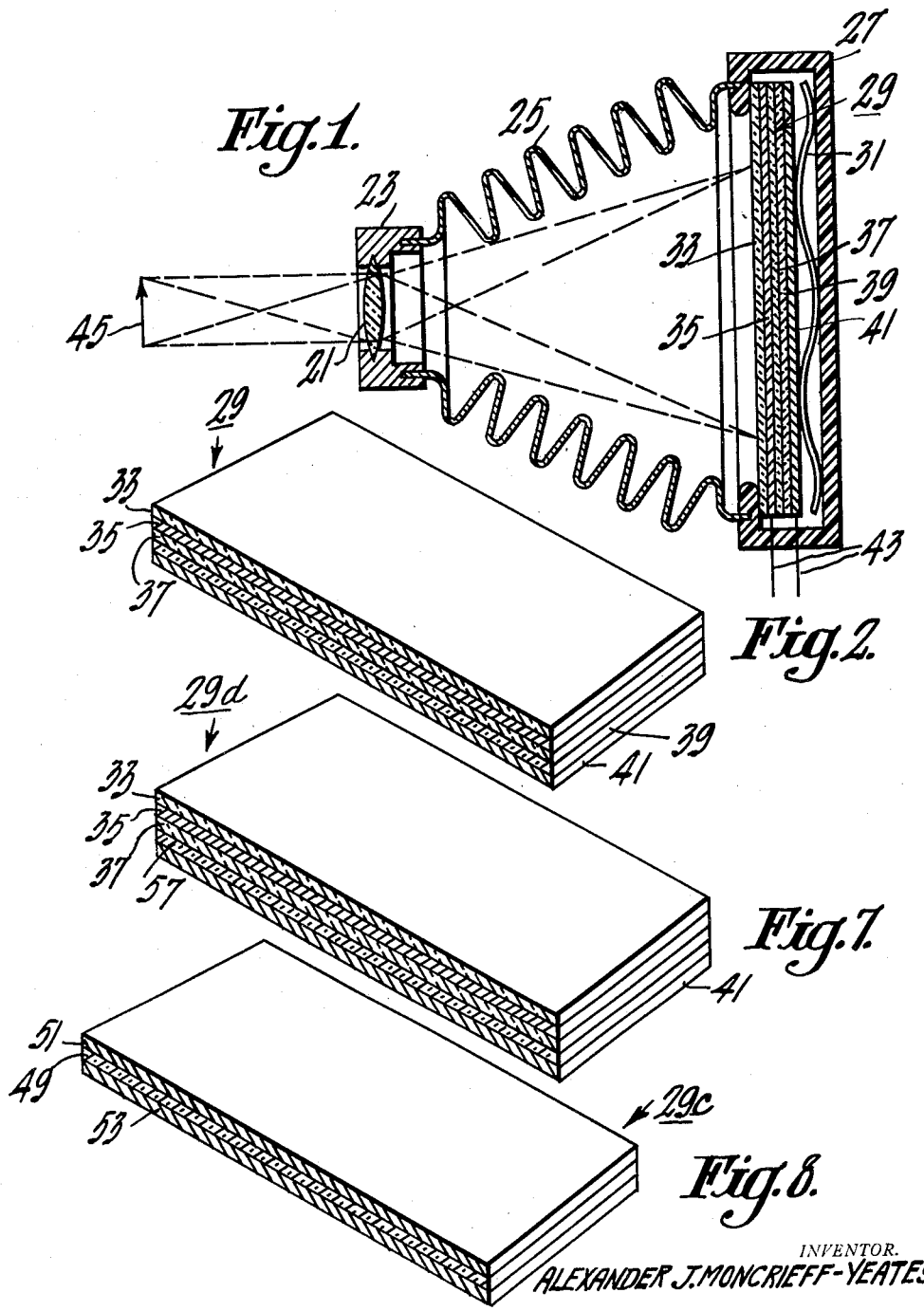

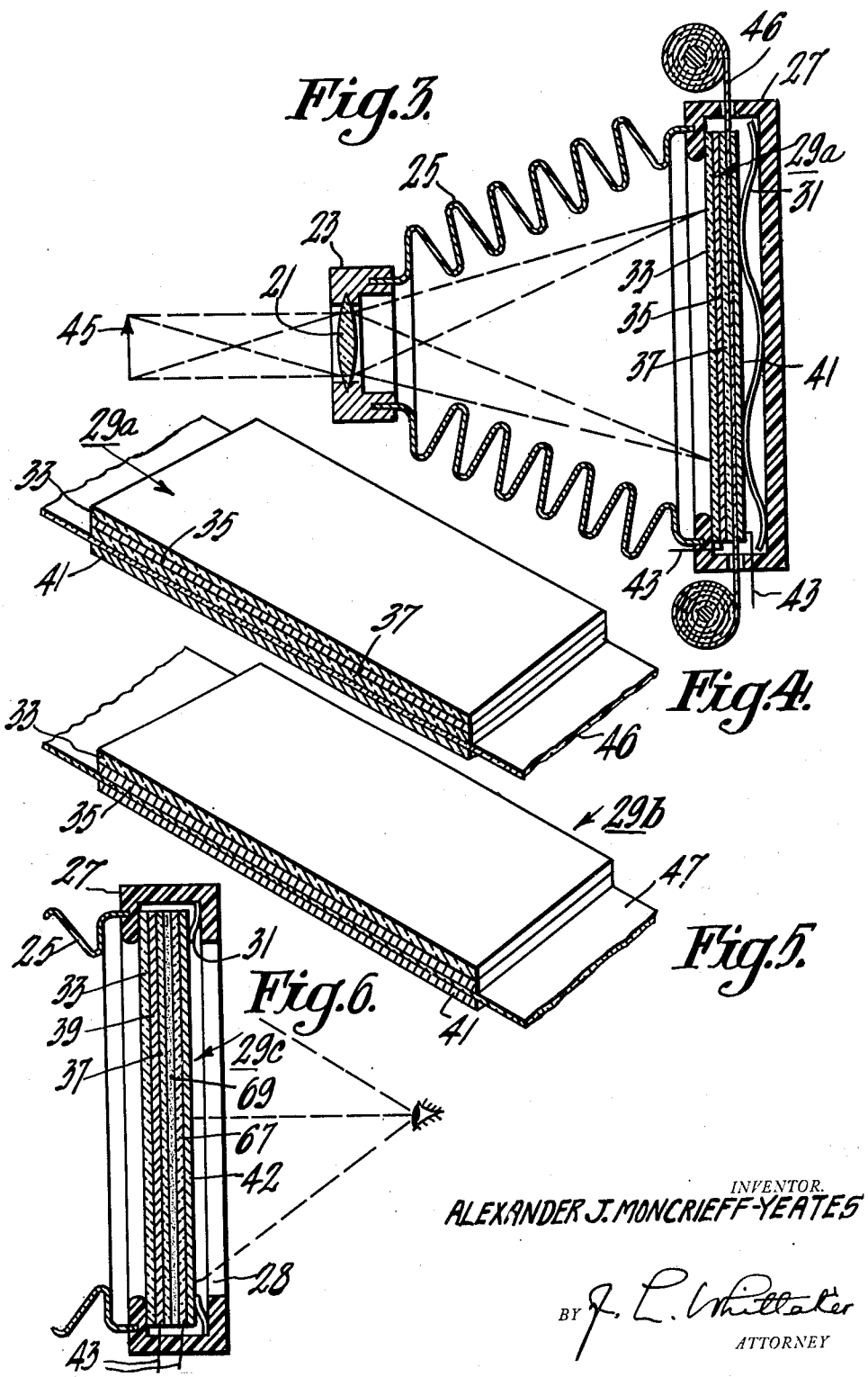

2,798,959

PHOTOCONDUCTIVE THERMOGRAPHY

Alexander J. Moncrieff-Yeates, Princeton Junction, N. J., assignor to Radio Corporation of America, a corporation of Delaware Application October 1, 1953, Serial No. 383,556

20 Claims. (Cl. 250—65)

This invention relates to thermography and more particularly to improved methods and means of thermography utilizing photoconductive materials.

Thermography generally refers to any process of writing or printing wherein heat is utilized to produce a visual effect. By one thermographic process, a probe scans the surface of a record-receiving sheet coated with a material that changes color when heated. Color variation in the record-receiving sheet may be obtained by controlling the temperature of the probe or the flow of electric current through the probe as it passes over the sheet. The record produced by this process comprises a series of adjacent scanned lines with spaces between and therefore continuous-tone prints are not easily obtained. This type of process is inherently slow because the entire print area must be covered by a relatively slow mechanical scanning process. Furthermore, a considerable amount of apparatus is required in order to pick up image elements and convert them to heat for use in the probe.

By a second type of thermographic process, an optical image is projected upon a layer of heat-sensitive material on a record-receiving sheet. The record-receiving sheet converts the incident light energy into heat thereby producing a thermal image. The differences in light intensities in the optical image are thereby converted into heat differentials. The thermal image produces a visual change in a heat-sensitive material on the record-receiving sheet. The visual change may be due, for example, to a chemical color change, fusion or evaporation of a material, or by changing the emission of a phosphor. The incident light provides all of the energy available to cause the change in the heat-sensitive material. Since the energy of light rays of low candle power is relatively small, the process requires relatively long exposures with light of low candle power, or shorter exposures with light of high intensity, or materials that are very sensitive to heat, or a combination of these, in order to produce a satisfactory record.

Because of the small energy content of light of low candle power, most commercially successful methods of image-recording include at least one step in which the energy in the incident light image is utilized to produce an image having a greater energy content. In this step, the energy of the incident light image usually controls some energy source which provides many times the amount of energy present in the incident light image. The incident light image may control a chemical reaction that is carried to completion during the subsequent development of the image. For example, in conventional silver halide photography an incident light image is projected upon a layer containing grains of silver halide. Light striking a silver halide grain, converts part or all of the halide grain to a form that may subsequently be converted into silver by chemical means. The process requires only very small quantities of light on only a small part of a halide grain in order to trigger the reaction that allows the development of the entire grain. The development step, which is a wet chemical process, provides the bulk of the energy required to produce the final print. It is estimated that the optical image provides only one ten-millionth of the total energy required to make the ordinary photographic print. Some of the advantages of amplifying the incident light image are that it permits (1) shorter exposure times, (2) lower intensities of illumination and (3) the use of less sensitive materials.

However, an image-recording process utilizing chemical steps has several inherent disadvantages. Some of the disadvantages of the silver-halide process are that (1) the chemical step requires the controlled application of reagents and subsequent removal of these reagents by washing and drying, (2) additional equipment is required to carry out the chemical steps, (3) usually the chemical steps must be carried out in the dark or under safety lamps, (4) additional time is required in order to carry out the chemical steps, and (5) an additional step is required to remove the unreacted silver halide from the record-receiving sheet.

It is an object of this invention to provide an improved printing process.

A further object is to provide an improved method and means of thermographic printing which utilizes photoconductive materials.

Another object of this invention is to provide a method and means of continuous tone thermography.

A further object of this invention is to provide a thermographic printing process that does not require chemical development in order to obtain amplifications of the light energy.

Another object is to provide a simple, direct, dry printing process which requires a minimum amount of equipment.

The foregoing objects and other advantages may be accomplished by the process of the present invention which comprises projecting an optical image on a photoconductive layer thereby changing the electrical resistivity of the photoconductive layer according to the optical image, passing an electric current through the photoconductive layer thereby producing a thermal image according to the electrical resistivity of the photoconductive layer, and then utilizing the thermal image to produce a visual image in a material which changes in visual characteristics in accordance with temperature changes. By one arrangement, a heat-sensitive material is distributed within the photoconductive layer. By a second arrangement, a heat-sensitive material comprises a separate layer in contact with the photoconductive layer. The visual changes in the heat-sensitive material may be due to color changes, evaporation, fusion, changes in luminescence emission or changes in magnetism.

An embodiment of the present invention comprises a pair of parallel adjacent electrodes, a layer of a photoconductive material between the electrodes, connection means for a source of voltage for the electrodes, means directing a light image on said photoconductive layer, and a layer of a material which changes in visual characteristics in accordance with temperature changes.

The invention will be described in greater detail by reference to the accompanying drawings in which:

Figure 1 is a sectional view of a camera that may be used to accomplish the present invention.

Figure 2 is a partially sectioned perspective view of an electrophotographic pack that may be used in the camera illustrated in Figure 1.

Figure 3 is a sectional view of a second camera that may be used to accomplish the present invention.

Figure 4 is a partially sectioned perspective view of an electrophotographic pack that may be used in the camera illustrated in Figure 3.

Figure 5 is a partially sectioned perspective view of another electrophotographic pack that may be used in the camera illustrated in Figure 3.

Figure 6 is a sectional view of a third camera that may be used to accomplish the present invention.

Figure 7 is a partially sectioned perspective view of another electrophotographic pack that may be used in the camera illustrated in Figure 1.

Figure 8 is a partially sectioned perspective view of an electrophotographic pack that may be used in the camera illustrated in Figure 6.

Figure 9 is a sectional view of a fourth camera that may be used to accomplish the present invention.

Figure 10 is a partially sectioned perspective view of another electrophotographic pack that may be used in the camera illustrated in Figure 1.

Similar reference characters are applied to similar elements throughout the drawings.

COLOR CHANGES

Example 1

Referring to Figures 1 and 2, a camera according to the invention comprises a lens 21, a lens holder 23, a bellows 25, and a pack holder 27. A thermographic pack 29 is placed in the pack holder 27 and held firmly in position by a spring 31. The thermographic pack 29 comprises a transparent plate 33 having superimposed on one side a transparent electrically-conducting layer 35 such as a NESA coating which may be obtained by treating the glass surface with tin chloride at about 400° C., a layer including a photoconductive material 37 such as cadmium sulphide thereon, a layer 39 including leuco-rosaniline hydrochloride thereon, and finally an electrically conducting layer 41 such as brass. The layers may be separate sheets pressed together or combinations of two or more layers in a single sheet. The pack is placed in the camera such that the transparent plate 33 is closest to the lens 21. A pair of leads 43 connect conducting layers 35 and 41 to a source of voltage of the order of 1,000 to 2,000 volts (not shown).

An image of an object 45 outside of the camera is focused upon the photoconductive layer 37 through the lens 21. The optical image causes the electrical resistivity of the photoconductive layer 37 to change according to the optical image. A voltage applied to the conducting layers 35 and 41 produces a flow of electric current through the photoconductive layer 37 in the pack 29. The current flow in each increment of area of the photoconductive layer 37 is a function of its resistivity. The flow of electric current heats the photoconductive layer, the heating effect in each increment of area being a function of the amount of current flowing, the resistivity of the photoconductive layer and the intensity of illumination. The leuco-rosaniline hydrochloride layer 39 changes from colorless to green when heated to a temperature between 100° and 200° C. Thus the light image upon the photoconductive layer 37, with a voltage applied, generates a thermal image thereon that produces a green image on the heat-sensitive layer 39. The temperature of the local areas of the thermal image is a function of the ambient temperature, the duration of the exposure, and the applied voltage.

In order to accelerate the formation of a visible image, it is often desirable to pre-heat the thermographic pack 29 within 20° C. below the change point of the leuco-rosaniline hydrochloride. One method is to heat the thermographic pack separately, for example, in an oven before insertion into the camera. Another method is to apply a voltage to the conducting layers 35 and 41 in darkness for a period before exposure. The small amount of dark current that passes will produce a uniform heating over the entire photoconductive area. The general heating effect will, of course, depend upon the actual amount of current that flows.

Example 2

The second embodiment of Figures 3 and 4 is similar to the arrangement in Figures 1 and 2, except that the layer 39 having the heat-sensitive material is replaced by a record roll sheet 46 that is impregnated with leuco-rosaniline hydrochloride. Suitable openings are left in pack holder 27 to allow the record sheet 46 to be wound through the pack 29a. Suitable take-off and take-up rolls may be provided as shown. The operation of the camera is identical with the operation of the camera of Figure 1, except that the image is obtained on the paper roll 46 and may be more easily removed and replaced by a method used in roll film cameras of conventional photographic methods.

Example 3

The thermographic pack 29b of Figure 5 is similar to the pack 29a of Figure 4, except that the photoconductive layer 37, and the heat-sensitive material is incorporated into a record sheet 47. The record sheet 47 may be a porous sheet impregnated or coated with a powdered zinc oxide and a vinyl chloride resin. The thermographic pack 29b, comprises a transparent plate having superimposed thereon a transparent electrically conducting layer 35, the movable record sheet 47, and a separate electrically-conducting plate 41 such as brass. A paper sheet 47 impregnated with the mixture of zinc oxide and a vinyl chloride resin is located between conducting layer 35 and conducting plate 41. The paper sheet 47 may alternatively be a paper coated or impregnated with a zinc containing material suspended in a resin containing vinyl and chloride radicals such as described by H. G. Greig in U. S. Patent 2,735,785, filed July 30, 1953, and by H. G. Greig and C. J. Young in their U. S. Patent 2,735,784, filed July 30, 1953. A pair of leads 43 connect conductive layers 35 and 41 to a source of appropriate voltage (not shown). When an image of an object 45 is focused upon the photoconducting material of the sheet 47, with a voltage applied to the conducting layers 35 and 41, a current will flow through the photoconductive layer producing a thermal image as described in Example 1. When a zinc containing compound is heated to about 120° C. in contact with a resin containing vinyl and chloride radicals, the materials react producing an intense black coloration. The application of about 1,000 to 2,000 volts to the conducting layers 35 and 41 for about a minute will energize the optical-electrical image thereon to heat the paper 47 sufficiently to produce a negative image on the paper.

Example 4

Referring again to Figures 1 and 2, a camera is provided as described in Example 1 except that heat sensitive layer 39 is replaced by a layer of starch dissolved in gelatin upon which is superimposed a layer of iodine dissolved in gelatin. Under ordinary circumstances starch and iodine will react to produce an intense black coloration. Since they are dissolved in gelatin they remain separated and the layer 39 appears colorless. However, both the application of an optical image to photoconductive layer 37 and the application of a suitable voltage to conducting layers 35 and 41, a thermal image causes the gelatin to melt allowing the starch to react with the iodine thereby producing a negative black and white image. The melting point of the gelatin is approximately 50° C.

Example 5

Referring to Figures 6 and 8, a fourth embodiment of the invention is similar to that described in Example 1 except that the pack holder 27 is cut out to permit the back of pack 29c to be observed. The thermographic pack 29c, which comprises a single crystal 49 of cadmium sulphide that has been coated on its face and back with a transparent electrically conducting coating 51 and 53, shown in detail in Figure 8, is introduced into the pack holder 27. The pack 29c is held firmly in place within the pack holder 27 by a spring 31. When the image of an object 45 is focused upon the crystal 49 and an electric potential is applied to the conducting layers 51 and 53, the current flowing through the crystal 49 produces a thermal image in the crystal according to the optical image. When cadmium sulphide is heated between 100° and 400° C., it changes color from red to yellow. The thermal image may, therefore, be observed through the opening 28 in the pack holder 27 as a red on yellow image in the crystal. This image will disappear upon cooling, hence this is a temporary record and must be utilized immediately upon formation. This arrangement may be used to follow slowly changing images.

The foregoing are a few examples of the instant invention utilizing chemical color changes. Chemical color changes also may be accomplished by temperature sensitive reactions such as decomposition, oxidation, reduction and change in pH. Innumerable examples may be drawn from the realms of organic and inorganic chemistry.

Yellow azoxybenzene decomposes at 36° C. Many colorless leuco-dyes are easily oxidized to the dye by weak oxidizing agents such as lead dioxide. Many colorless materials are easily reduced to a dye by reducing agents such as zinc dust.

Alternatively, the constituents may be brought together by heat, the chemical reaction being a secondary phenomenon to the action of heat. For example, when a film of wax is melted locally, allowing an alkaline substance to react with phenolphthalein, a brilliant violet coloration results.

Again trapped bubbles of hydrogen sulphide gas liberated from a melted wax, could be made to react with a cadmium salt to yield a deep yellow color, or could enable electrophoresis to take place.

By another arrangement, one of the constituents may be liberated in situ. For example, a mixture of ferrous sulphate which is pale blue and anhydrous cupric sulphate which is white, can exchange water to yield an intense blue coloration. This reaction is easily accomplished at about 64° C.

TRANSLUCENCY

*Example 6*

Referring again to Figure 5, a modification of the invention is similar to the camera described in Example 2, except that the paper 47 is impregnated with a low melting wax such as beeswax or paraffin wax, and a powdered photoconductor such as cadmium sulphide, zinc oxide, or cadmium selenide. When wax is heated to its melting point, it changes from translucent to transparent. An image of an object 45 focused upon paper 47 and an electric potential applied to layers 35 and 41 produces a thermal image. The thermal image melts the wax in the illuminated areas producing a transparent image in the illuminated areas on a translucent background. A temperature of about 60° C. is required to melt beeswax. A voltage of about 500 to 1,000 volts with a one minute exposure produces satisfactory translucency changes. Since the wax reverts back to its solid translucent state upon cooling, the image is only temporary and must be utilized immediately. This type of arrangement may be used to follow small changing light intensities.

FUSION

*Example 7*

Referring again to Figure 1, another modification of the invention is similar to that described in Example 1, except that a different thermographic pack 29d is used. The thermographic pack 29d illustrated in Figure 7 comprises a glass plate 33 having a transparent electrically-conducting layer 35 thereon. A layer 37 which comprises a photoconductor such as lead iodide, a dye such as methylene blue in a wax such as 3-nitro-acetonitrile is superimposed upon the conducting layer 35. An absorbent, electrically-conducting layer 57 such as chemical filter paper that has been made electrically conducting by impregnation with an ionic solution of agar-agar is placed over the wax layer 37. A brass plate 41 or other electric-conducting material is placed over the paper 57. The thermographic pack 29d is held firmly in position in the pack holder 27 by a spring clip 31. When an image of an object 45 is focused upon layer 55 and an electric potential is applied to conducting layers 35 and 41, a thermal image is generated causing the wax to melt in selected areas. The wax flows into the paper 57 thereby forming an image on the paper comprising a colored wax on a white paper.

EVAPORATION

*Example 8*

Figure 9 shows a fifth embodiment of the invention which comprises a lens 21, a lens holder 23, a bellows 25, and a pack holder 27. A second paper strip 59 is selectively passed through the pack holder. A thermographic pack 29e is placed in pack holder 27. The thermographic pack 29e comprises a transparent plate 33 having a transparent electrically-conducting coating 35 thereon. Superimposed on the transparent conducting layer 35 is a layer 61 comprising a mixture of 30% by weight of a wax such as 2,4 dinitroamine and 70% by weight of a powdered photoconductor such as cadmium sulphide. A copper mesh 63 is placed on top of the wax-photoconductor layer 61. When an image of an object 45 is focused upon the layer of wax and photoconductor 61, and an electric potential is applied between conducting layer 35 and wire mesh 63, a thermal image of the object 45 is produced in the photoconductor material. The thermal image sublimes a corresponding image in the wax. The wax passes through the wire mesh 63 and condenses upon the paper strip 59. The wax 2,4 dinitroamine sublimes at a temperature between 100 and 200° C.

LUMINESCENCE

*Example 9*

Referring to Figure 6, a camera is provided similar to the camera described in Example 1, except that the pack holder 27 is open to permit the back of thermographic pack 29c to be viewed. A thermographic pack 29c is provided which comprises two transparent sheets 42 and 33 having transparent electric conducting coatings 39 and 67 on their inner faces. A layer of a photoconductive material 37 such as cadmium sulphide is superimposed on conducting layer 39. A layer of a manganese-activated zinc sulphide phosphor 69 is placed between photoconductive layer 37 and conductive layer 67. At room temperature manganese-activated zinc sulphide exhibits a red luminescence. However, when heat is applied this luminescence is extinguished. The phosphor is excited and a thermal image is produced by shining an image of an object 45 on the photoconductive layer 37 with an electric potential applied through leads 43. The luminescence emission of the phosphor will change from red to darkness, in the illuminated areas, yielding a negative black on red image. The image may be observed through the back of pack holder. Images may also beproduced by utilizing phosphors whose emission is intensified by the application of heat or whose emission is shifted from one part of the spectrum to another by the application of heat.

Although almost every phosphor is heat-sensitive at some range of temperatures, phosphors that are heat-sensitive slightly above room temperature are preferred. Examples of such phosphors are manganese-activated zinc sulphide, copper activated zinc sulphide, zinc sulphide activated with manganese and copper, and manganese activated cadmium silicate.

MAGNETISM

*Example 10*

A camera is provided as described in Figure 1. A thermographic pack 29f is placed in pack holder 27 and is shown more clearly in Figure 10. The thermographic pack 29f comprises a transparent plate 33 having a transparent electrically-conducting coating 35 thereon. A photoconductive layer 37 comprising cadmium selenide is superimposed on conductive layer 35. A magnet 71 is spaced from photoconductive layer 37 by spacers 73. A powdered ferrospinel 81 such as 65% N:O·35% ZnO is placed in the space between photoconductive layer 37 and magnet 71. The powdered ferrospinel is held erect by the magnetic field produced by magnet 71. The above-mentioned ferrospinel has a Curie temperature of about 100° C. A thermal image is produced by shining the image of an object 45 on photoconductive layer 37 while an electric potential is applied to conducting layer 35 and magnet 71. When the temperature of the thermal image rises above the Curie temperature localized areas of the powdered ferrospinel lose their magnetic properties and fall on layer 37. The pack is then removed and separated leaving a positive image corresponding to the image of object 45 on the magnet 71, and a negative image of object 45 on photoconductive layer 37.

The several examples described are illustrative of the principles of this invention. It will be understood that these and many other arrangements as well as many other materials may be used. In general, the invention includes the passage of an electric current through a photoconductive layer upon which an optical image has been focused, thereby producing a thermal image. The thermal image is then used to produce a visual image in a material which changes visual characteristics in accordance with the thermal image.

The optical image may comprise any type of electromagnetic wave energy that will produce a change in the resistivity of the photoconductive layer. Thus by choosing the proper photoconductive material, one may use infra-red, visible, ultra-violet, X-rays, etc., to form the optical image.

Almost any photoconductive material may be used. Examples are selenium, anthracene, cadmium selenide, lead iodide, and arsenic trisulphide. The photoconductive layer may comprise a single photoconductor, mixtures of two or more photoconductors or one or more photoconductors mixed with an insulating material such as a resin. The selection of the photoconductive material will depend on the desired spectral sensitivity and speed of response.

The electric potential used to produce the current flow through the photoconductive material may be direct or alternating. The optimum applied voltage and the allowable range of voltages will be determined by the nature and thickness of the photoconductive layer. It has been found convenient to use direct current voltages of about 1,000 to 2,000 volts on photoconductive layers about one hundredth of an inch thick. However, this invention is not limited to this range of voltages and thickness.

The temperatures at which the thermal image is utilized to produce a visible image depends upon the temperature at which the heat-sensitive material changes or the heat-sensitive reaction takes place. Almost any heat-sensitive material or reaction may be used. Thus the invention may be practical over a very wide range of temperatures. Ordinarily, records are made at about room temperatures, so the materials and reactions that produce a visible change somewhat above room temperatures are preferred.

The heat-sensitive materials may be included in a layer separate from the photoconductive layer or may be included with the photoconductor in a single photoconductive layer. In either case, the passage of an electric current will generate heat in both the heat-sensitive material and the photoconductive material due to their resistivities.

To increase the speed at which the record may be made, it is desirable to raise the temperature of the thermographic pack to below and within 20° C. of the temperature at which the visible change in the heat-sensitive material takes place. One method is to heat the thermographic pack in a separate chamber, for example, in an oven. Another method is to apply an electric potential to the terminals of the thermographic pack in the darkness. The photoconductive layer passes a small dark current which heats the layers to the desired temperatures. It may be desirable to provide insulating media about the pack to prevent the pack from cooling.

There has thus been described an improved process of printing. The instant invention provides a simple, direct, and economical one-step process for recording optical images. By selecting a suitable arrangement, temporary or permanent records may be obtained and the record may be produced in any color.

Unlike conventional silver halide photography, the thermographic packs are not sensitive to light. The pack will produce an image only when a light image is focused on the pack and the voltage is applied to produce a thermal image as an intermediate step. Thus it can be seen that special precautions as to exposure to light are unnecessary during manufacture and distribution of the packs.

Upon exposure, the method of the instant invention produces a finished record that may be utilized immediately. The steps of development, fixing, and subsequent printing are eliminated entirely, thus, saving time, effort and equipment. The unit also offers the advantage of controlling the quality of record image by means of the lens and diaphragm, but also by controlling the voltage applied to the thermographic pack.

The apparatus for carrying out the process of the instant invention is simple in construction and operation and therefore very desirable as a simple, self-contained, portable unit.

What is claimed is:

1. A process of thermography which comprises projecting an optical image on a photoconductive layer, thereby changing the elemental area electrical resistivity of the photoconductive layer in response to corresponding elemental area intensities of said optical image, then, during the life of said change in resistivity, passing an electric current through said photoconductive layer so as to produce a thermal image substantially corresponding to said optical image in said photoconductive layer and utilizing said thermal image to produce a visual image substantially corresponding to said thermal image.

2. A process according to claim 1 wherein said electric current is direct.

3. A process according to claim 1 wherein said electric current is alternating current.

4. A process according to claim 1 including preheating the photoconductive layer and a material that produces a visual change upon the application of heat to a temperature below and within about 20° C. of the visual change point of said heat-sensitive material.

5. A process of thermography which comprises raising the temperature of a layer of a photoconductive material in contact with a heat-sensitive material that is heat sensitive and produces a visual change to a temperature below and within about 20° C. of the visual change point of said heat-sensitive material, projecting a light image on said photoconductive layer thereby changing the electrical resistivity of said photoconductive layer according to said light image, and simultaneously passing an electric current through said materials so as to generate a heat image in said photoconductive layer, whereby said heat image changes said heat-sensitive material forming a permanent image.

6. A thermographic pack comprising a pair of electrodes, and a photoconductive material and a heat-sensitive material that produces a visible change upon the application of heat interposed between and in electrical contact with said electrodes, said electrodes being coextensive with the effective area of said photoconductive material and said heat-sensitive material and one of said electrodes in contact with said photoconductive material being optically transparent and connection means for a source of voltage for said electrodes.

7. A device according to claim 6 including means for illuminating said photoconductive material to provide a visible image in said heat-sensitive material.

8. A thermographic pack according to claim 6 wherein said heat-sensitive material is a separate layer in contact with said photoconductive layer.

9. A thermographic pack according to claim 6 wherein said heat-sensitive material is distributed evenly within said photoconductive layer.

10. A thermographic pack according to claim 6 wherein said heat-sensitive material changes from translucent to transparent upon heating.

11. A thermographic pack according to claim 10 wherein said material is a wax having a low melting point and said photoconductive layer comprises cadmium sulphide.

12. A thermographic pack according to claim 6 wherein said heat-sensitive material melts upon heating.

13. A thermographic pack according to claim 12 wherein said material is contained in said photoconductive layer which comprises lead iodide, methylene blue, and 3-nitro-acetonitrile.

14. A thermographic pack according to claim 6 wherein said heat-sensitive material evaporates upon heating.

15. A thermographic pack according to claim 14 wherein said material is contained in said photoconductive layer which comprises 2,4 dinitroamine and powdered cadmium sulphide.

16. A thermographic pack according to claim 6 wherein said heat-sensitive material is a phosphor whose luminescence changes upon heating.

17. A thermographic pack according to claim 16 wherein said phosphor is manganese-activated zinc sulphide and said photoconductive material comprises cadmium sulphide.

18. A thermographic pack according to claim 6 wherein said heat-sensitive material loses its magnetic properties upon heating.

19. A thermographic pack according to claim 18 wherein said material is a powdered ferrospinel having the composition 65% NiO 35% ZnO, $Fe_2O_3$ and said photoconductive layer comprises cadmium selenide.

20. A thermographic pack comprising a photoconductive layer, a layer comprising a heat-sensitive material superimposed on one side of said photoconductive layer, a first optically transparent electrode on the other side of and in intimate contact with said photoconductive layer, a second electrode on the other side of and in intimate contact with said layer of heat-sensitive material, said electrodes being coextensive with the effective area of said photoconductive material and said heat-sensitive material means directing a light image on said photoconductive layer, and connection means for a source of voltage for said electrodes.

References Cited in the file of this patent

UNITED STATES PATENTS

| | | |
|---|---|---|
| 1,820,088 | Parker et al. | Aug. 25, 1931 |
| 1,845,835 | Frankenburger et al. | Feb. 16, 1932 |
| 2,317,789 | Marriott | Apr. 27, 1943 |
| 2,409,454 | Thomas | Oct. 15, 1946 |
| 2,549,546 | Thomas | Apr. 17, 1951 |
| 2,650,310 | White | Aug. 25, 1953 |
| 2,692,178 | Grandadam | Oct. 19, 1954 |
| 2,764,693 | Jacobs et al. | Sept. 25, 1956 |

FOREIGN PATENTS

| | | |
|---|---|---|
| 188,030 | Great Britain | Oct. 23, 1922 |